US007264450B2

(12) United States Patent
Christensen

(10) Patent No.: US 7,264,450 B2
(45) Date of Patent: Sep. 4, 2007

(54) PUMP UNIT AND METHOD FOR OPERATING A PUMP UNIT

(75) Inventor: Jorgen Christensen, Bjerringbro (DK)

(73) Assignee: Grundfos a/s (DK)

( * ) Notice: Subject to any disclaimer, the term of this patent is extended or adjusted under 35 U.S.C. 154(b) by 266 days.

(21) Appl. No.: 10/450,772

(22) PCT Filed: Dec. 22, 2000

(86) PCT No.: PCT/EP01/14656

§ 371 (c)(1),
(2), (4) Date: Oct. 6, 2003

(87) PCT Pub. No.: WO02/052156

PCT Pub. Date: Jul. 4, 2002

(65) Prior Publication Data

US 2004/0052645 A1 Mar. 18, 2004

(30) Foreign Application Priority Data

Dec. 22, 2000 (DE) ................................ 100 64 717

(51) Int. Cl.
*F04B 17/03* (2006.01)
*H02K 5/10* (2006.01)

(52) U.S. Cl. ............................ 417/53; 310/86; 310/87; 417/423.13

(58) Field of Classification Search ........... 417/423.13, 417/53; 310/86, 87
See application file for complete search history.

(56) References Cited

U.S. PATENT DOCUMENTS

| | | | | | |
|---|---|---|---|---|---|
| 3,075,104 | A | * | 1/1963 | Willyoung et al. | 310/54 |
| 3,135,884 | A | * | 6/1964 | Luenberger | 310/87 |
| 3,495,537 | A | * | 2/1970 | Archibald | 417/372 |
| 3,744,935 | A | | 7/1973 | Magni | |
| 5,144,177 | A | | 9/1992 | Rupprecht | |
| 6,140,725 | A | * | 10/2000 | Jensen et al. | 310/87 |

* cited by examiner

*Primary Examiner*—Charles Freay
(74) *Attorney, Agent, or Firm*—Jacox, Meckstroth & Jenkins

(57) ABSTRACT

The method is provided for operating a pump unit with a centrifugal pump which is driven by an electric motor and which comprises a rotor running in a split tube. The rotor space is separated with respect to the stator in a fluid-tight manner. On running the motor to its operational rotational speed the fluid located in the rotor space due to the increasing rotational speed evaporates and is removed so that the motor finally functions as a dry-runner.

15 Claims, 2 Drawing Sheets

PUMP UNIT AND METHOD FOR OPERATING A PUMP UNIT

BACKGROUND OF THE INVENTION

The invention relates to a system and method for operating a pump.

Centrifugal pump units of a smaller or average power which today are part of the state of the art are usually designed as wet runners, i.e. they comprise a split tube which seals the rotor space with respect to the stator space, in particular, from the penetration of delivery fluid. The delivery fluid located in the rotor space in particular also serves for the lubrication of the bearings carrying the rotor shaft. The pumps of this construction type have proven themselves since they do not require any seal to the region of the movable parts, the rotor space may thus be conductingly connected to the pump space.

On the other hand, from the state of the art it is also known to apply dry runners, i.e., to seal the shaft carrying the pump impeller with respect to the motor. In order here to seal the rotor space with respect to the delivery fluid in a reliable manner and over a long time, one requires complicated sealing designs which are expensive and are often prone to wear.

Although the dry runners are basically superior to the wet runners with regard to efficiency since the distance between the rotor and the stator may be reduced and the magnetic field between these components is not weakened by the split tube, the extra expense for seals and the maintenance which is also required for long-term operation is so large that at least with small or average construction sizes one almost exclusively uses wet running motors. Otherwise one must ensure the permanent lubrication of the bearing.

In order to increase the hydraulic power of such centrifugal pumps and their efficiency, it is known to allocate a frequency converter to the unit, which is connected in front of the electric motor and permits a practically infinitely high rotational speed of the motor independently of the mains frequency and voltage. With an increasing rotational speed however the fluid friction between the rotor and split tube becomes noticeable so that with this construction type an increase in the rotational speed beyond certain limits is not very useful.

BRIEF SUMMARY OF THE INVENTION

Against this state of the art it is the object of the present invention to create a method for operating a pump unit with which an operation of the pump is possible at high rotational speeds. Furthermore, a pump unit according to the known type is to be designed such that it may be operated at high rotational speeds without having the initially outlined disadvantages of the two systems (wet runner/dry runner).

The part of this object with regard to the method is achieved by providing a method for operating a pump unit with a centrifugal pump and with an electric motor driving this, whose rotor runs in a split tube which separates the rotor space with respect to the stator in a fluid-tight manner, wherein during and/or after running up the motor to an operational rotational speed the fluid located in the rotor space is at least partly removed. The part with regard to the device is achieved by a pump unit, in particular for operating according to the method with a centrifugal pump and with an electric motor driving this, whose rotor runs in a split tube which separates the rotor space with respect to the stator in a fluid-tight manner, wherein there are provided means which seal the rotor space with respect to the delivery fluid in a pressure-limited manner.

Advantageous formations of the invention are indicated in the dependent claims, the subsequent description and the drawings.

The basic concept of the present invention is to operate a wet-running motor such that, although this may be designed as a wet running motor with regard to its construction type, it however has the properties of a dry runner in operation, in particular it runs without the liquid which is usually located in the rotor space with wet-running motors. By way of this, the design advantages of the wet-running motor which requires no complicated seals between the pump and the motor may be retained without having to do without characteristics of a dry runner which are particularly advantageous at high rotational speeds. The invention thus envisages at least partly removing the fluid located in the rotor space before during and/or after running up the motor. At the same time the fluid located between the rotor and split tube is preferably evaporated by way of the effect of heat. It is indeed precisely in this region that the removal of the fluid is particularly important since it is here that the greatest friction output arises on account of the high relative speeds between the rotor and split tube.

Numerous design variants are possible for the construction with regard to the device for operating a pump unit. This may be achieved with a particularly simple design and thus inexpensively in that the rotor space is sealed with respect to the delivery fluid in a pressure-limited manner. Such a pressure-limited sealing is sufficient in order to keep the rotor space largely free of fluid during operation. At the same time the design does indeed envisage the rotor space being filled with fluid before the start of the running of the motor. The fluid however is indeed removed from the rotor space either by way of a valve specially envisaged for this, by way of a seal only effective up to a certain pressure or by way of other suitable means in that on account of the heating the fluid evaporates and thus the volume is increased. By way of this the pressure rises until the pressure limitation of the rotor space is exceeded and the fluid located here escapes, be it in gaseous or liquid form. The vapor pressure which then prevails here at the same time leads to the fact that no further delivery fluid enters the rotor space. Also the pump design may be advantageously envisaged as with a wet-running motor so that in particular the fluid-lubricated sliding bearings favorable for high rotational speeds may be applied.

In order to be able to ensure the supply of the bearings with fluid also if the rotor space is largely free of fluid at operational rotational speed of the motor, the invention envisages arranging the bearing carrying the rotor outside the rotor space. At the same time however at least one bearing carrying the rotor, preferably that furthest from the pump impeller is arranged within the split tube since then a fluid supply may take place via the central shaft bore and thus a largely axial pressure compensation on the shaft may take place.

It is favorable if both shaft ends are led out of the rotor space, wherein then an impeller is provided at one shaft end and the fluid to be led away out of the rotor space may be led away near to that end of the shaft distant to the impeller. Specifically as previously outlined, if a pressure compensation exists via a shaft bore or another conduit connection, the removal of the fluid from the rotor space may be effected almost without pressure and need not be effected against the delivery pressure of the pump. Such a removal is particularly simply possible with a conduit connection through the shaft, thus if this end of the shaft is impinged by the pressure of the suction side of the pump.

Axial face seals are preferably applied as pressure-limited sealing means, wherein the setting of the pressure limitation is effected by selection of a suitable spring with which the axial face seal ring is held in contact.

It is useful if the axial face seal in each case is arranged between the rotor and the adjacent bearing, wherein the bearing receiver for the bearing removed from the impeller is seated within the split tube. At the same time, the bearing receiver is usefully sealed with respect to the split tube by way of an outer seal and with respect to the stationary part of the axial face seal by way of an inner seal.

In order to be able to remove fluid as completely as possible from the rotor space it is useful either for the bearing receiver or the axial face seal to bear at the end-face on the rotor with play or for there to be provided a separate displacement component between the bearing receiver and the rotor which reduces the free volume between the end-face of the rotor and the bearing receiver, said volume being able to be filled by fluid on operation. This displacement component is usefully manufactured of heat-insulating material, preferably plastic in order to prevent the heat deliberately produced in the rotor space for evaporating the fluid located here from being led away at the end-face, or to prevent condensation arising in this region. For this reason it is useful to also manufacture the bearing receivers from a heat-insulating material.

In order to achieve as quick and complete as possible evaporation of the fluid located in the rotor space it may be advantageous to design the split tube heatable at least in a part region. In principle the production of heat may be effected by friction in the region between the rotor and the split tube so that the fluid is automatically heated on running up the motor and is thus evaporated. To supplement this or for evaporation, one may however also provide a heating of the split tube before the start of the motor, be it due to an electrical resistance heating or also inductively, in particular on account of the magnetic field formed on operation between the rotor and the stator. As a motor it is particularly advantageous to apply a permanent magnet motor.

These and other objects and advantages of the invention will be apparent from the following description, the accompanying drawings, and the appended claims.

BRIEF DESCRIPTION OF THE DRAWINGS

The invention is hereinafter described in more detail by way of an embodiment example shown in the drawing. There are shown in.

DETAILED DESCRIPTION OF THE INVENTION

Figure 1:
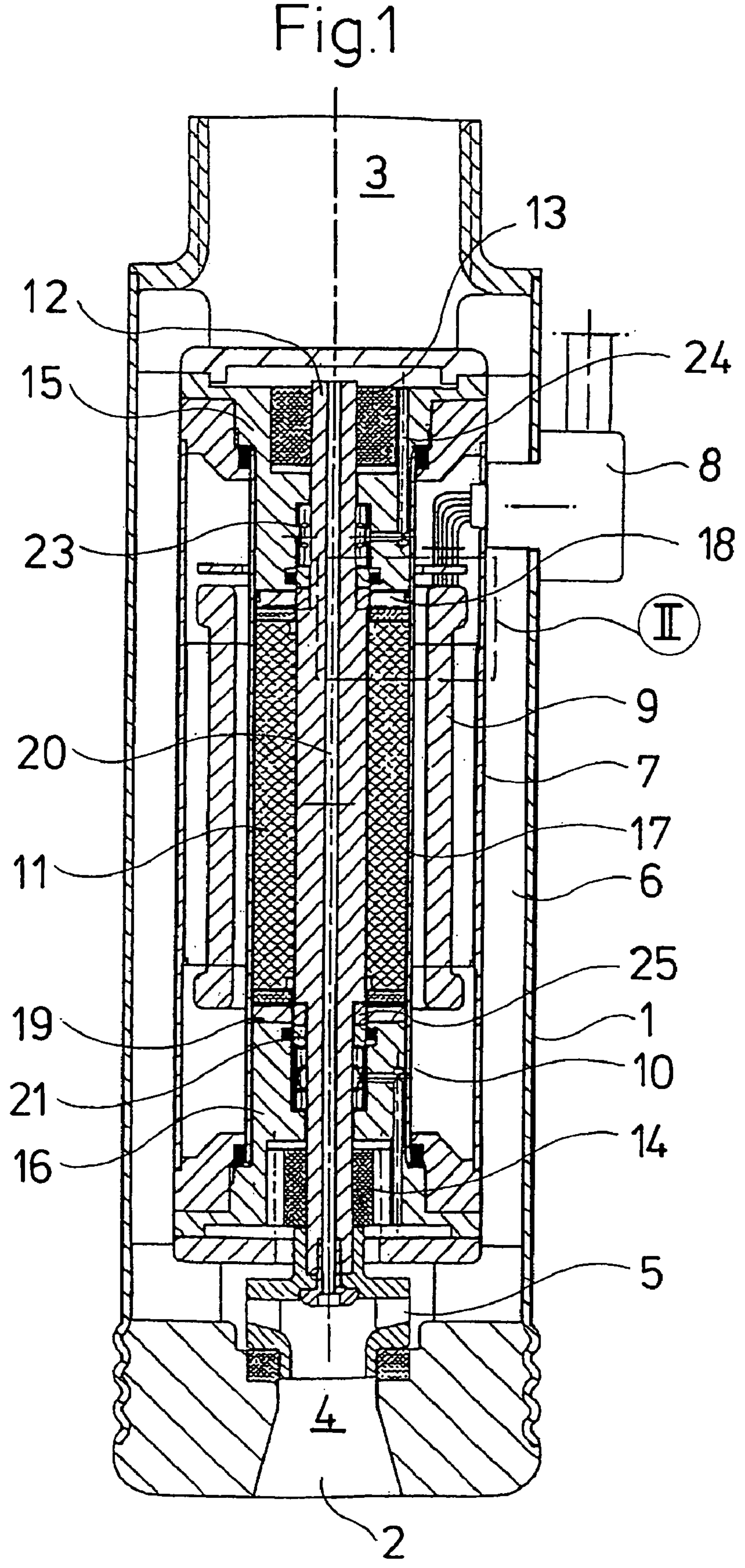
FIG. 1 a longitudinal section through a centrifugal pump unit according to the invention and FIG. 2 the detail 11 in FIG. 1 in an enlarged representation.

The pump unit shown in the figures comprises a housing 1 of a round cross section on whose lower end-face there is formed a suction-side inlet 2 and on whose upper end-face there is formed a pressure-side outlet 3. The fluid to be delivered is suctioned at the inlet 2, from here reaches a suction opening 4 of an impeller 5 of the pump from which it goes radially outwards into an annular channel 6 to the outlet 3.

The channel 6 is delimited at its outer side by the housing 1, on its inner side by a motor housing 7 which is fixed within the housing 1. The electrical supply of the unit is effected by an electrical connection 8 which is led laterally out of the motor housing 7, passes through the channel and is led out of the housing 1. The motor housing 7 accommodates a stator 9 which is limited on its inner side by a split tube 10. Within the split tube 10 there runs a rotor 11 which is seated on a shaft 12 which near to its ends is mounted in sliding bearings 13, 14 which are seated in bearing receivers 15, 16 fixed within the split tube 10 and thus within the motor housing 7.

The split tube 10 radially delimits a rotor space 17 which at the end-face is limited spatially and in a pressure-limited manner with respect to the remaining split tube space by way of axial face seals 18, 19.

Figure 2:
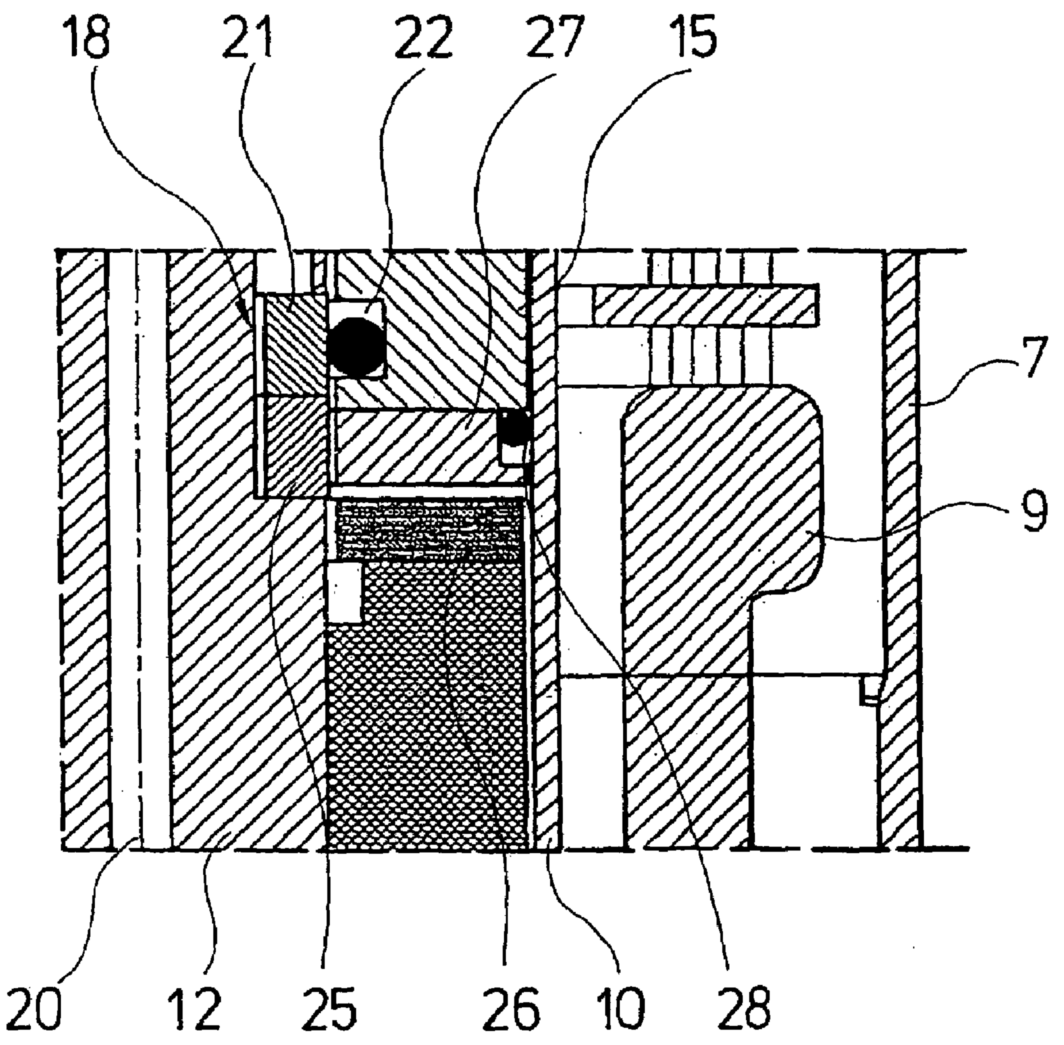

The shaft 12, which is mounted within the sliding bearings 13 and 14, at the lower end carries the impeller 5 and also the rotor 11. It comprises a central passage hole 20 which forms a conducting connection between the suction opening 4 and the upper end of the motor housing 7 which in FIG. 1 is at the top. Since the shaft 12 is not sealed with respect to the pump space as is usual with wet-running motors, the upper bearing 13 via the bore 20 and well as the lower bearing 14 is supplied with delivery fluid. With this the delivery pressure of the pump prevails at the lower bearing 14, whereas the suction-side pressure prevails at the upper bearing 13. The rotor space 17 is sealed with respect to the split tube space filled with fluid on operation only via axial face seals 18 and 19. The construction of such an axial face seal is represented by way of the upper axial face seal 18 in FIG. 2.

The axial face seal 18 consists of a stationary axial face seal ring 21 which is incorporated within the component forming the bearing receiver 15, is radially sealed with respect to this by way of an O-ring 22 and is displaceably mounted in the axial direction of the shaft 12. This stationary axial face seal ring 21 is impinged with a pressure force by a helical spring 23 surrounding the shaft 12. The helical spring 23 is likewise arranged within the component forming the bearing receiver 15. This annular space formed between the shaft 12 and the component forming the bearing receiver 15 is connected to the space delimited by the motor housing 7 via a channel 24 in a region of the upper bearing 13 which is conductingly connected to the bore 20.

A rotating axial face seal ring 25 bears at the end-face on the stationary axial face seal ring 21, it is seated within the shaft shoulder and rotates with the shaft 12.

The thus formed axial face seal 18 seals the rotor space 17 to the remaining split tube space, a corresponding sealing is provided at the other side of the rotor 11.

On starting the pump the rotor space 17 may be completely or partly filled with delivery fluid. As soon as the rotational speed of the motor increases the fluid located in the rotor space is heated, until finally the fluid evaporates and the pressure within the rotor space 17 rapidly increases. If the limit pressure formed by the axial face seal 18 and determined by the pressure force of the spring 23 is exceeded, the stationary axial face seal ring lifts from the rotating axial face seal ring 25, thus moves upwards in the representation according to FIG. 1, by which means the rotor space 17 is conductingly connected via the channel 24 to the space surrounding the bearing 13. The rotor space is automatically emptied via the axial face seal 18 by way of the pressure formed in the rotor space 17 until finally only vapor is located in the rotor space and no fluid. The motor then functions quasi as a dry-running motor. The operational rotational speed of such a motor may for example lie between 40,000 and 100,000 revolutions per minute. The described procedure is repeated with each start of the motor as long as the rotor space 17 is again filled with fluid.

In order to ensure as complete as possible removal of the fluid from the rotor space 17 at the end-face of the rotor 11 there is provided a co-running first displacement body 26 (FIG. 2) which is arranged at the end-face of the rotor, as well as a second stationary displacement body 27 which via an O-ring 28 bears tightly on the split tube 10. The displacement bodies 26 and 27 are formed of heat-insulating plastic and have essentially two tasks. On the one hand they are to extensively fill the space remaining in the rotor space 17 between the rotor 11 and the bearing receiver 15 in order to minimize the free volume of the rotor space 17 and thus the possible fluid accommodation of this. On the other hand, these bodies 26 and 27 represent insulation bodies which insulate the rotor space 17 which is hot on operation, from the remaining bearing space in order thus to avoid a formation of condensation in this region and thus an increased friction. The formation and arrangement of the axial face seal 19 arranged on the other side of the rotor 11 corresponds functionally to the construction described with regard to axial face seal 18. Here too there are provided displacement bodies 26 and 27. Due to the design, the removal of the fluid from the rotor space 17 may be effected via one or both of the axial face seals 18 and 19. Preferably however, this is effected via the upper axial face seal 18, since here via the bore 12 there prevails only the suction-side pressure, whereas the pressure-side pressure prevails at the other axial face seal 19 which must be overcome on removal of the fluid from the rotor space.

With the above-described embodiment example the heating and evaporation of the fluid located in the rotor space is effected automatically as soon as suitable rotational speed regions have been reached. According to the invention however one may provide an additional electrical or other type of heating, thus in particular the split tube may be heated in the region outside the rotor 12, thus where the displacement bodies 26 and 27 are arranged. Also instead of the axial face seal one may provide a pressure relief valve at a suitable location in the rotor space, for example in the split tube in order to remove fluid. The motor represented in the embodiment example is a d.c. motor, however one may also employ a.c. motors or high-rate motors.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for operating a pump unit with a centrifugal pump and with an electric motor driving this, whose rotor runs in a split tube which separates a rotor space with respect to a stator in a fluid-tight manner, said method comprising the step of:

sealing said rotor space with at least one seal that seals said rotor space with respect to the fluid in a pressure-limited manner, said at least one seal permits fluid located between said rotor and said split tube to be at least partly removed by evaporation by the effect of heat during or after running up the motor to an operational rotational speed.

2. The method according to claim 1, wherein said method further comprises the step of providing at least one axial face seal for sealing the rotor space with respect to the delivery fluid in a pressure-limited manner.

3. A pump unit, comprising a centrifugal pump driven by an electric motor, comprising a rotor situated in a split tube which separates a rotor space with respect to the stator in a fluid-tight manner, and at least one seal which seals said rotor space with respect to the delivery fluid in a pressure-limited manner, said at least one seal permitting fluid located between said rotor and said split tube to be at least partly removed by evaporation by the effect of heat during or after running up the motor to an operational rotational speed.

4. The pump unit according to claim 3, wherein a plurality of bearings carrying the rotor are arranged outside said rotor space.

5. The pump unit according to claim 3, wherein at least one bearing carrying the rotor is arranged within the split tube.

6. The pump unit according to claim 3, wherein said electric motor comprises shaft ends and both shaft ends are led out of the rotor space, wherein an impeller is provided at one shaft end and wherein the fluid to be removed is led away near to a second shaft end.

7. The pump unit according to claim 3, wherein a bearing receiver and/or a displacement component consists of a heat-insulating material.

8. The pump unit according to claim 3, wherein said split tube is heatable at least in a part region.

9. The pump unit according to claim 3, wherein said split tube is electrically heatable.

10. The pump unit according to claim 3, wherein said split tube is inductively heatable.

11. The pump unit according to claim 10 wherein said inductive heating of the split tube is by the magnetic field formed between the rotor and the stator.

12. The pump unit according to claim 3, wherein the motor is a permanent magnet motor.

13. A submersible pump unit comprising a centrifugal pump driven by an electric motor, wherein a bearing receiver or an axial face seal bears with play on a rotor at an end-face, or there is provided a separate displacement component between the bearing receiver and the rotor which reduces the free volume between the rotor and the bearing receiver which may be filled by fluid in operation and further comprising:

said rotor situated in a split tube which separates a rotor space with respect to a stator in a fluid-tight manner; and at least one seal which seals the rotor space with respect to the delivery fluid in a pressure-limited manner and said at least one seal enabling fluid located between said rotor and said split tube to be at least partly removed by evaporation by the effect of heat during or after running up the motor to an operational rotational speed.

14. The submersible pump unit according to claim 13, wherein said bearing receiver and/or said displacement component consists of a heat-insulating material.

15. A pump unit, comprising a centrifugal pump driven by an electric motor, comprising a rotor situated in a split tube which separates a rotor space with respect to the stator in a fluid-tight manner, wherein there is provided at least one seal which seals the rotor space with respect to the delivery fluid in a pressure-limited manner; and wherein at least one axial face seal seals the rotor space with respect to the delivery fluid in said pressure-limited manner, said at least one axial face seal enabling or permitting fluid located between said rotor and said split tube to be at least partly removed by evaporation by the effect of heat during or after running up the motor to an operational rotational speed.

* * * * *